United States Patent
Katta

Patent Number: 5,891,207
Date of Patent: Apr. 6, 1999

[54] ENGINE INTAKE-AIR FILTER APPARATUS

[75] Inventor: Masahiko Katta, Shizuoka, Japan

[73] Assignee: HKS Co., Ltd., Shizuoka, Japan

[21] Appl. No.: 884,042

[22] Filed: Jun. 27, 1997

Related U.S. Application Data

[63] Continuation of Ser. No. 501,099, Jul. 28, 1995, abandoned.

[30] Foreign Application Priority Data

Jan. 6, 1994 [JP] Japan .................................... 6-011313

[51] Int. Cl.$^6$ .................................................. B01D 46/00
[52] U.S. Cl. ............................ 55/385.3; 55/492; 55/505; 55/524
[58] Field of Search ............................. 55/320, 327, 336, 55/385.3, 486, 487, 492, 505, 511, 524

[56] References Cited

U.S. PATENT DOCUMENTS

| | | | |
|---|---|---|---|
| 1,215,974 | 2/1917 | Orem | 55/505 |
| 2,942,683 | 6/1960 | Moyer | 55/505 |
| 3,031,827 | 5/1962 | Onstad et al. | 55/492 |
| 3,300,952 | 1/1967 | Cuta | 55/511 |
| 3,431,335 | 3/1969 | Henning | |
| 3,681,898 | 8/1972 | Hopkins et al. | 55/487 |
| 4,631,077 | 12/1986 | Spicer et al. | 55/487 |
| 4,704,143 | 11/1987 | Percy | 55/487 |
| 4,758,460 | 7/1988 | Spicer et al. | 55/487 |
| 5,437,701 | 8/1995 | Townsley | 55/487 |

FOREIGN PATENT DOCUMENTS

| | | | |
|---|---|---|---|
| 0483814 | 8/1917 | France . | |
| 1025281 | 4/1953 | France . | |
| 2170744 | 9/1973 | France . | |
| 2359221 | 6/1974 | Germany | 55/492 |
| 268295 | 10/1929 | Italy | 55/492 |
| 59-13662 | 1/1984 | Japan . | |
| 59-22282 | 7/1984 | Japan . | |
| 0282382 | 3/1928 | United Kingdom . | |

Primary Examiner—C. Scott Bushey
Attorney, Agent, or Firm—Dvorak & Orum

[57] ABSTRACT

An air filter apparatus for engine intake-air in which a filter support member is stretched in a filter attaching frame of an outer frame structure member, and filter is supported on the filter support member, wherein the filter is integrally incorporated with the filter support member.

7 Claims, 10 Drawing Sheets

Prior Art

ENGINE INTAKE-AIR FILTER APPARATUS

This application is a continuation of application Ser. No. 08/501,099, filed Jul. 28, 1995, now abandoned.

FIELD OF THE INVENTION

The present invention relates to an engine intake-air filter apparatus.

BACKGROUND OF THE INVENTION

An engine intake-air cleaner apparatus is incorporated in an intake-air system of an engine in order to remove dust from intake-air and to reduce noise of intake-air.

There exists a conventional air-cleaner apparatus adapted as an air-filter apparatus to be removably fitted in an air-cleaner casing which is attached to an air-cleaner conduit. In this air-filter apparatus, a filter support member such as a net or the like is stretched in a filter attaching frame of an outer structural member which is held in the air-filter casing so as to support an air-cleaner filter with the use of the filter support member.

There exists another air-filter apparatus which is attached directly to the intake-air port of an air cleaner casing. In this air-filter apparatus, a filter support member such as an inner net is stretched in a filter attaching frame of an outer structural member such as a funnel attached to an air-cleaner conduit, and an air-cleaner filter is supported with the use of the filter support member.

In conventional air-filter apparatuses for an air-cleaner apparatus, although the filter is held by any means in the filter attaching frame of the outer frame structure member, the filter is merely set and held on the filter support member.

Further, in the conventional air-filter apparatuses, the filter support member is generally formed of hard metal materials such as stainless steel wires or a perforated stainless steel sheet.

However, conventional air-filter apparatuses have several disadvantages.

First, the filter support member repeatedly knocks the filter which is vibrated by pulsation of the intake-air in an engine so as to cause occurrence of a dust beat phenomenon by the filter. The dust beat phenomenon causes, in turn, dust caught on the inlet side part of the outer surface of the filter to gradually enter the inside of the filter, and is finally sucked into the engine from the outlet of the filter, resulting in the lowering of the dust collecting effect.

Second, the filter which is vibrated by pulsation of the intake-air in the engine and the filter support member made of hard metal materials repeatedly beat each other for a long time. As a result, the filter support member tends to break at the proximal part thereof which is attached to the outer frame structural member, so as to deteriorate the filtering function.

In addition, since the filter support member is made of hard metal materials, it bumps upon another part so as to possibly cause a damage such as bending or the like during physical distribution, and installation.

One object of the present invention therefore is to provide an engine intake-air filter apparatus which can prevent a filter from causing occurrence of the dust beating phenomenon.

Another object of the present invention is to provide an engine intake-air filter apparatus which prevents a filter from causing occurrence of a dust beating phenomenon, and which prevents damage to the filter during physical distribution, installation or usage of the filter apparatus.

Figure 12:
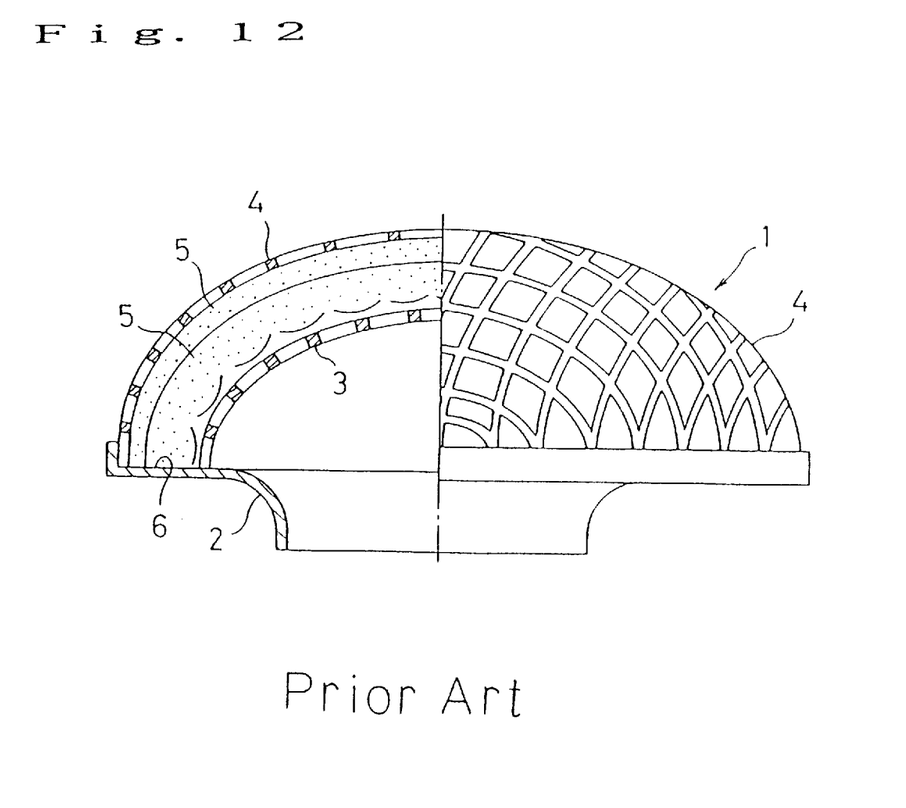
FIG. 12 is a side view illustrating a left half part of a conventional air-cleaner apparatus.

One example of conventional air-cleaner apparatuses will be hereinbelow explained with reference to FIG. 12 illustrating an air-filter apparatus 1 attached directly to the intake-air port of an air-cleaner apparatus in which a flared opening of a funnel 2 is covered with an inner net 3 and an outer net 4 between which an air-cleaner filter 5 having a two-layer structure is laid.

The end parts of the inner net 3 are fixed to a flat part 6 of a funnel 2 while the end parts of the outer net 4 are removably secured to the end parts of the flat part 6. Further, each of these inner and outer nets 3, 4 is originally a rectangular net which is formed into a substantially semi-spherical shape. Further, an air-cleaner filter 5 is a wet-type filter which is impregnated with oil (having a coefficient of viscosity of 3 to 5 pa.s) in order to enhance the dust collecting effect.

However, in the air-filter apparatus 1 shown in FIG. 12, the inner net 3 and the outer net 4 are laid respectively over the front and rear surfaces of the filter 5, and accordingly, the intake-air opening area of the filter 5 is decreased so that the intake-air resistance possibly increases.

Another object of the present invention is to provide an air-cleaner filter which reduces the intake-air resistance so as to enhance the output power of an engine.

In the conventional filter apparatus 1, it is desirable to increase the flared opening of the funnel 2 in order to enhance the intake-air efficiency.

However, if the size of the funnel is increased, the air-filter apparatus 1 requires a larger-size which is unpreferable for an air-filter apparatus adapted to be located in a limited space.

Further, since the outer net 4 is a rectangular net which is formed into a substantially spherical shape, a curved part thereof is deformed, that is, its rectangular shape is deformed into a diamond-like shape or the like, and more specifically, each of the corners thereof is greatly deformed. This deformation hinders the flow of the intake-air, and accordingly, the intake-air efficiency is possibly lowered.

Further, since the air-cleaner filter 5 is impregnated with oil having a small coefficient of viscosity, in case the size of pores in porous resin (such as polyurethane resin) which forms the air-cleaner filter is large, the impregnation of oil would be insufficient. Accordingly, the air-cleaner filter 5 is made of porous resin which is impregnated with the oil, resulting in increased flow-passage resistance of the air-cleaner filter 5. In view of this point, the intake-air efficiency is lowered.

An object of the present invention is to provide an air-cleaner apparatus which can enhance the intake-air efficiency without increasing the size of the air-cleaner apparatus.

DISCLOSURE OF THE INVENTION

According to the present invention, there is provided an engine intake-air filter apparatus comprising an outer frame structure member including a filter attaching frame, a filter support member stretched in the filter attaching frame, and a filter integrally incorporated with the filter attaching frame.

The filter support member is made of a flexible resilient material.

The present invention has several advantages.

Since the filter is integrally incorporated with the filter support member by means of an adhesive or the like, the filter is not separable from the filter support member even though the filter is vibrated by pulsation of the engine intake-air, and accordingly, it is possible to prevent the filter from being beaten by the filter support member. Thus, dust caught at the filter support member is prevented from passing through the filter due to the dust beat phenomenon whereby it is possible to prevent lowering the dust collecting efficiency.

Since the filter support member is made of a flexible resilient material, the filter support member can bend so as to follow up vibration of the filter caused by pulsation of the engine intake-air, and accordingly, it is prevented from being broken at its proximal end part which is attached to the outer frame structure member.

Since the filter support member is freely flexible, it is never damaged even though it bumps upon another part during physical distribution of the filter apparatus, installation onto an air-cleaner apparatus and so forth.

According the present invention, there is provided an air-cleaner apparatus in which a plurality of stacked filter elements having different properties are semi-spherically arranged, the peripheral edge parts of the above-mentioned filter elements are integrally incorporated with one another so as to firmly maintain the filter elements in a substantially spherical shape.

According to the present invention, the innermost one of the stacked filters is cut three dimensionally at its inner surface.

The present invention has the following additional advantages.

Since the peripheral edge parts of the plurality of air-cleaner filters are integrally incorporated with each other so as to maintain the air-cleaner filter composed of the filter elements in a substantially semi-spherical shape, it is possible to eliminate the necessity of covering of the air-cleaner filter with holding members such as nets or the like. Due to the absence of holding members, the intake-air opening area of the air-cleaner filter can be increased so as to reduce the intake-air resistance, thereby it is possible to enhance the outlet power of the engine.

According to the present invention, there is also provided an air-cleaner apparatus wherein a flared opening of a funnel is covered with an inner frame and an outer frame between which a filter is interposed, comprising a lip part that is planted on the inner peripheral surface of the flared opening of the above-mentioned funnel, opposing the flowing direction of the intake-air.

According the present invention, the inner frame is composed of a top part which extends to the center part of the flared opening of the funnel, and a plurality of frame bars radially extend from the top part.

In one embodiment, the outer frame is formed of a honeycomb-like net.

And the filter is formed of porous resin having a large pore size impregnated with an adhesive having a high coefficient of viscosity.

The present invention has the following additional advantages.

Since the lip part is planted on the inner peripheral surface of the flared opening of the funnel, a negative pressure area is induced upstream of and below the lip part due to the stream of intake-air so that the flow rate of intake-air flowing into the funnel from the outer peripheral part of the flared opening of the funnel is heightened, and as a result, the volume of intake-air is increased. Thereby it is possible to enhance the intake-air efficiency without the size of the air-cleaner apparatus being increased by increasing the size of the funnel.

Since the outer frame is formed of a honeycomb-like net in a substantially semi-spherical shape, the honeycomb-like deformation is equally divided into six portions, and accordingly, the deformation at each corner of the honeycomb-like (hexagonal) filter is less than that of the conventional rectangular shape net. Accordingly, it is possible to enhance the intake-air efficiency without hindering the stream of intake-air.

Since the filter is formed of porous resin impregnated with an adhesive having a high coefficient of viscosity, the adhesive can enhance the dust collecting efficiency, and since the pore size of the porous resin is large, the flow passage resistance of the filter becomes small, therefore, it is possible to enhance the intake-air efficiency.

BRIEF DESCRIPTION OF THE DRAWINGS

FIGS. 1A and 1B show an embodiment of the present invention, in which

FIGS. 8A and 8B show an embodiment of an air-cleaner apparatus according to the present invention, in which

FIGS. 9A and 9B show an external appearance of the air-cleaner apparatus shown in FIGS. 8A and 8B, in which

FIGS. 10A and 10B show a funnel in the air-cleaner apparatus shown in FIGS. 8A and 8B, in which

FIGS. 11A and 11B show an inner frame in the air-cleaner apparatus shown in FIGS. 8A and 8B, in which

BEST PRACTICAL MODES OF THE INVENTION

Figure 1A:
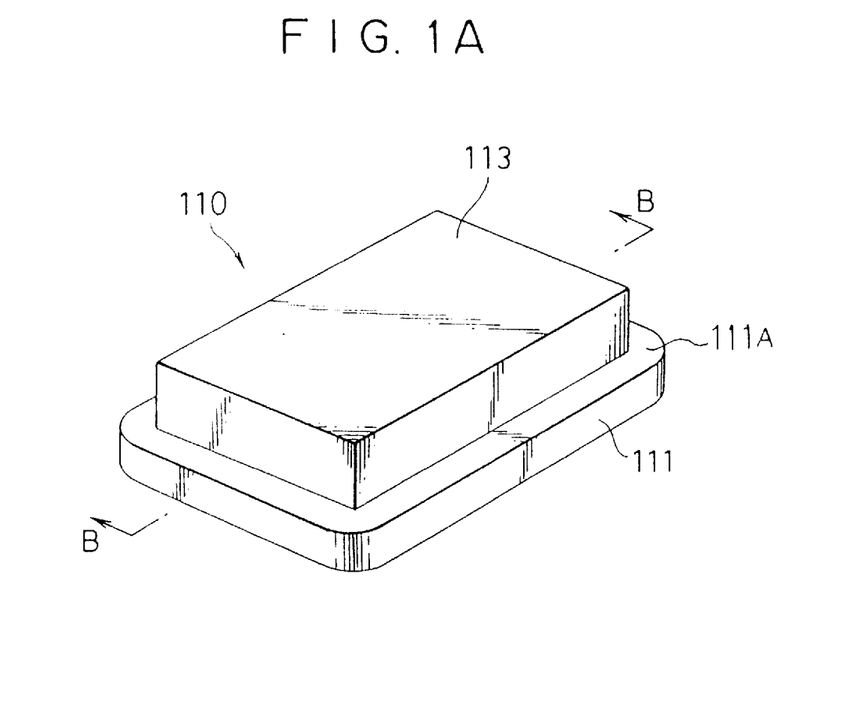
FIG. 1A is a perspective view illustrating an air-filter apparatus in its entirety.
Figure 1B:
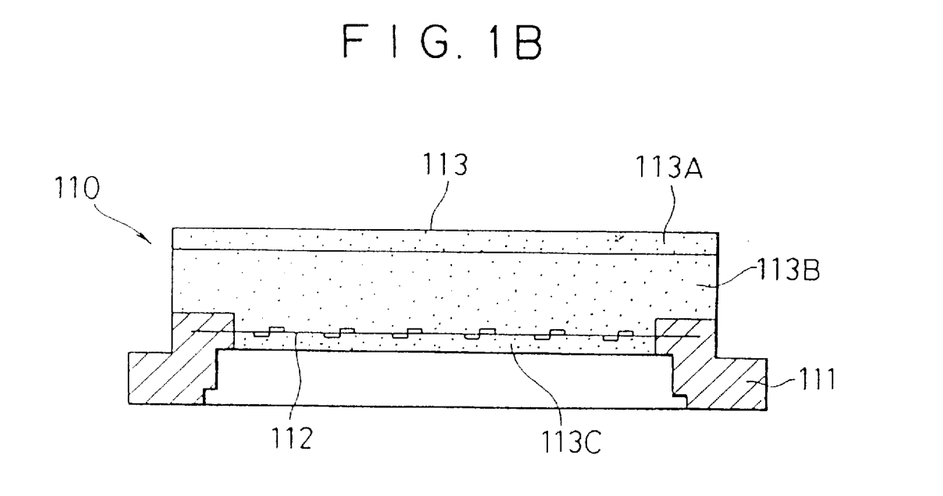
FIG. 1B is a sectional view along line B—B in FIG. 1A.
Figure 2:
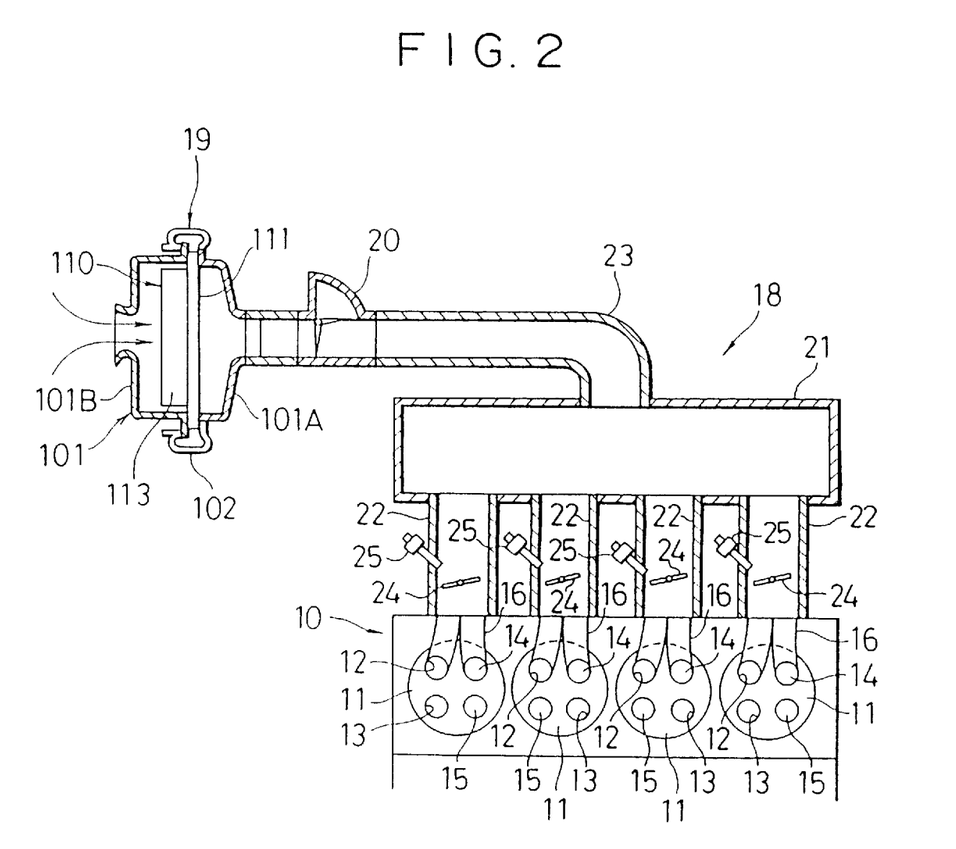
FIG. 2 is a sectional view illustrating an intake-air system of an engine to which the air-filter apparatus shown in FIGS. 1A and 1B is applied.

First Embodiment (FIGS. 1 and 2)

At first, explanation will be hereinbelow made of a first embodiment of the present invention with reference to FIGS. 1 and 2. As shown in FIG. 2, each of combustion chambers 11 of a multi-cylinder engine 10 is formed therein with an intake-port 12 and an exhaust port 13 which are opened and closed respectively by an intake valve 14 and an exhaust valve 13. Further, the intake-port 12 is communicated with an intake-air passage 16, and the exhaust port 13 is communicated with an exhaust passage (which is not shown).

An intake-air system 18 of the above-mentioned engine 10 is composed of an air-cleaner apparatus 19, an air-flow meter 20, a surge tank 21 and inlet manifolds 22 which are coupled to one another in the mentioned order. The air-flow meter 20 is connected to the surge tank 21 through the intermediary of an air-cleaner hose 23. Further, the inlet manifolds 22 are connected to intake-air passages 16 of the multi-cylinder engine 10.

Each inlet manifold 22 is incorporated therein with a throttle valve 24 and a fuel injector 25. Air sucked through the air-cleaner apparatus 19 is introduced into the inlet manifolds 22 by way of the surge tank 21 in accordance with an opening degree of the throttle valve 24. The air-flow meter 20 detects a volume and a temperature of the introduced air, and the fuel injectors 25 inject fuel in accordance with these detected values so as to obtain a mixture having an optimum air-fuel ratio. Thus the obtained mixture is led into the combustion chambers 11 of the engine 10.

In the above-mentioned air-cleaner apparatus 19, as shown in FIG. 2, the air-cleaner hose 23 is attached at its intake-air inlet port with an air cleaner casing 101 in which the air-filter apparatus 110 is replaceably installed. The air-cleaner casing 101 is composed of a lower casing 101A fixed to the air-cleaner hose 23, and an upper casing 101B which is adapted to be opened and closed to and from the lower casing 101A and which is clamped to the same by a damper 102. Further, an outer frame structure member 111 is air-tightly interposed between the lower and upper casings 101A, 101B which are clamped together by the clamper 102.

The air-filter apparatus 110 is composed of the outer frame structure member 111, a filter support member 112 and a filter 113, for removing dust from air led into the engine 10, and for enhancing the intake-air efficiency. The outer frame structure member 111 is made of synthetic resin such as polyurethane or rubber while the filter support member 112 is synthetic resin (a flexible resilient material) such as nylon, and the filter 113 is made of porous resin such as polyurethane.

In the air-filter apparatus 110, the outer frame structure member 111 incorporates at its outer peripheral part a stepped part 111A to be clamped, which is clamped air-tightly between the lower and upper casings 101A, 101B of the air-cleaner casing 101. Further, in the air filter apparatus 110, the filter support member 112 which is net-like, and which is composed of several wires or an integral molding member is stretched in a filter attaching frame of the outer frame structure member 111, and the filter 113 is supported on the support member 112.

In this arrangement, the filter 113 is integrally incorporated with the filter member 112 with the use of an adhesive or the like. Further, the filter support member 112 which is made of, as mentioned above, a flexible resilient material such as nylon, can be flexibly and freely bent, or elastically deformed by an external force.

The filter 113 is planar, and is composed of a coarse outer filter 113A, a fine intermediate filter 113B and a coarse inner filter 113C which are joined together in a three layer structure. These filters 113A, 113B, 113C are made of, as mentioned above, porous resin, that is, polyurethane resin in this embodiment. The filters 113A, 113C are made of coarse polyurethane resin having a large pore size while the filter 113B is made of polyurethane resin having an intermediate pore size. The outer filter 113A, the intermediate filter 113B and the inner filter 113C are bonded together by heating and melting their opposite adhesive surfaces (this process is called flame lamination).

Further, the filter support member 112 is interposed between the intermediate filter 113B and the inner filter 113C, and is bonded to them.

Further, the outer filter 113A, the intermediate filter 113B and the inner filter 113C of the filter 113 are impregnated with an adhesive (which is not shown) having a high coefficient of viscosity. As this adhesive, chlorinated paraffin or the like is used, having a coefficient of viscosity which is higher than about 100 pa.s. but lower than about 350 pa.s. After the fibers of the filters 113A, 113B, 113C are swelled and softened with the use of a solvent (such as a methylene chloride or thinner), the softened fibers are impregnated with the above-mentioned adhesive having a high coefficient of viscosity.

It is noted that the outer frame structure member 111, the filter support member 112 and the filter 113 are integrally molded with each other so as to be formed into an integrally body.

Next, explanation will be hereinbelow made of the technical effects of this embodiment.

Since the filter 113 is integrally incorporated with the filter support member 113 by an adhesive or the like, the filter 113 is never separated from the filter support member 112 even though the filter 113 is vibrated by pulsation of intake-air in the engine 10, and accordingly, the filter 113 is prevented from being beaten by the filter support member 112. Thus, dust caught on the filter 113 is prevented from passing through the filter 113 as has been conventionally caused by a dust beating phenomenon, whereby it is possible to prevent lowering of the intake-air efficiency.

Since the filter support member 112 is made of a flexible resilient member, the filter support member 112 can bend so as to follow the vibration of the filter 113 caused by pulsation of intake-air, and accordingly, it is possible to prevent the filter support member 112 from being broken at the proximal end part thereof which is attached to the outer frame structure member 111.

Since the filter support member 113 is freely flexible, it is not damaged when the air filter apparatus bumps upon another part during physical distribution of the air filter apparatus 110, during installation thereof into the air-cleaner apparatus 19 and so forth.

Since the filter support member 112 is interposed between the intermediate filter 113B and the inner filter 113C of the air-filter device 110 at its opposite sides, and is integrally incorporated with them, the filter is hidden so as to be invisible, thereby it is possible to enhance the external appearance of the air filter apparatus 110.

Since the filter 113 is made of porous polyurethane resin, and is impregnated with an adhesive having a high coefficient of viscosity, the intake-air efficiency thereof can be enhanced. In addition, since the filter 113 can be impregnated with the adhesive having a high coefficient of viscosity even though the pore size of the porous polyurethane is large, the flow passage resistance of the filter can be reduced in comparison with a fine filter having a small pore size, thereby it is possible to enhance the intake efficiency.

The air filter apparatus according to the present invention can be applied to an air-cleaner apparatus adapted to be directly attached to the intake-air inlet port of an air-cleaner hose (in this case, the air-filter apparatus has an arrangement such that the inner net or the outer net, as the filter support member, which is, for example, an inner frame 27, an outer net 28 or the like in a third embodiment of the present invention that will be described later, is stretched in the filter attaching frame of the outer-frame structure member such as a funnel or the like, and the filter is integrally incorporated with this filter support member). Further, the filter support member and the filter supported by the former may not only be planar but curved-surface-like or semi-spherical.

SECOND EMBODIMENT (FIGS. 3 to 7)

Figure 3:
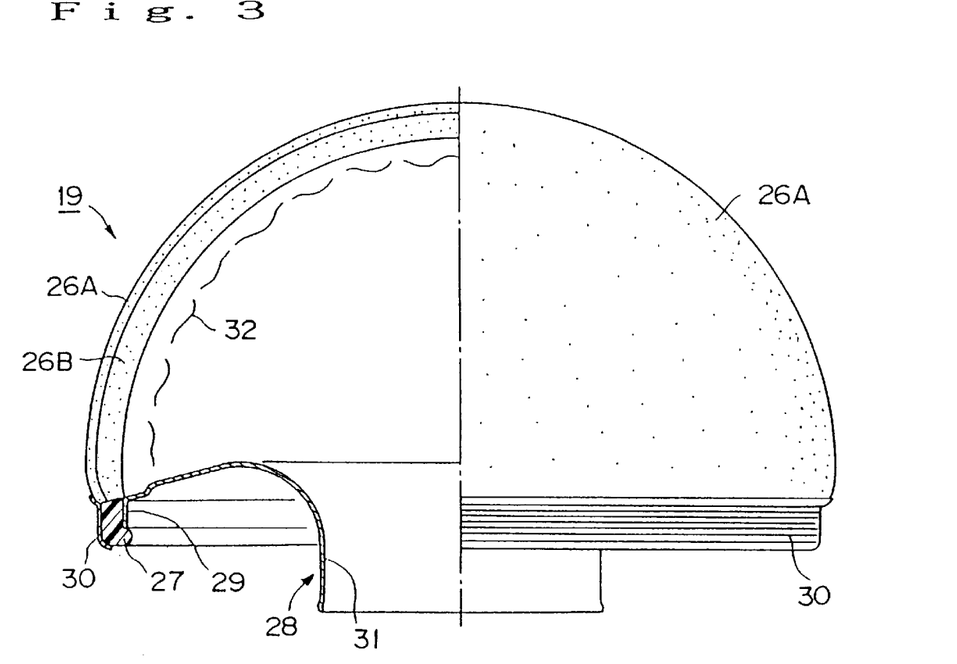
FIG. 3 is a side view illustrating a left-half part of an embodiment of an air-cleaner filter according to the present invention, which is show being sectioned.
Figure 4:
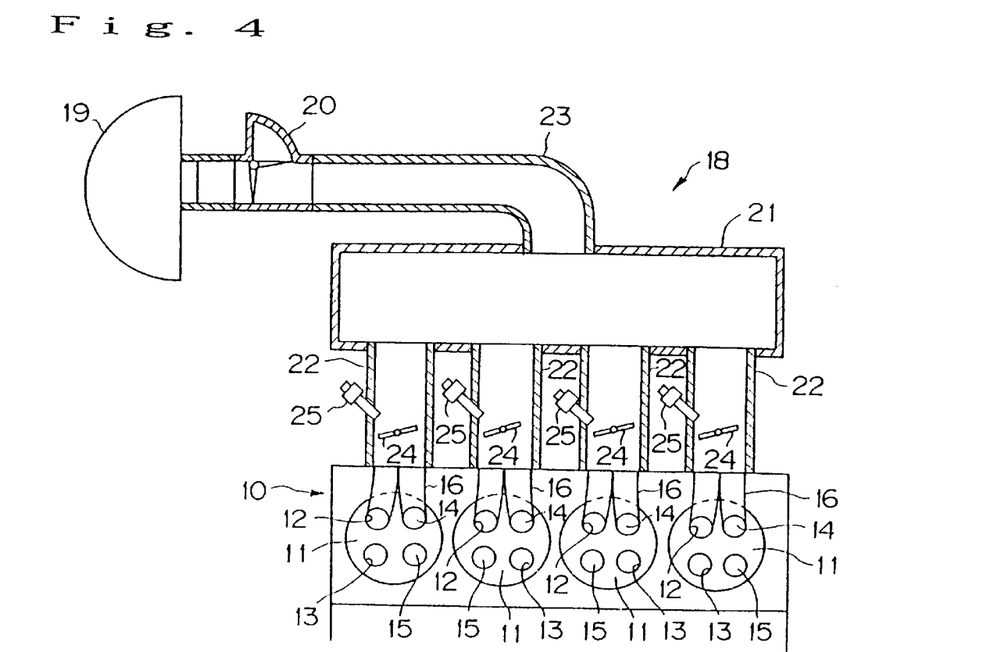
FIG. 4 is a sectional view illustrating an engine intake-air system to which the air-cleaner filter shown in FIG. 3 is applied.
Figure 5:
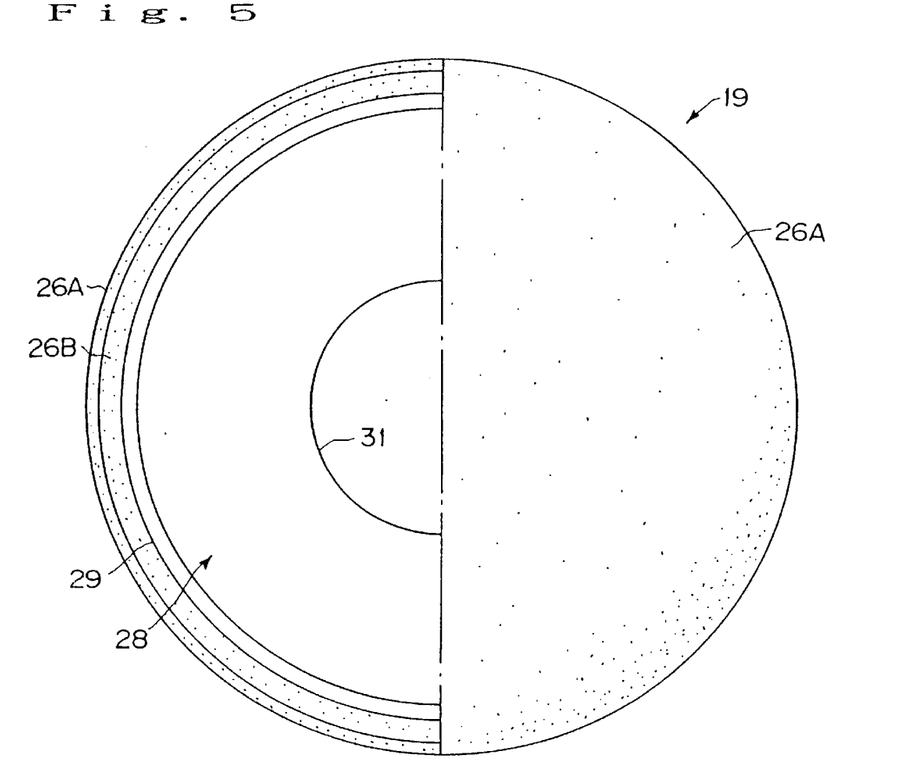
FIG. 5 is a plan view illustrating the left-half part of the air-cleaner filter shown in FIG. 3, which is shown being sectioned.

An air-cleaner filter 19 shown in FIGS. 3 to 5, is composed of filter elements 26A, 26B having different properties, which are stacked one upon another and are formed in a substantially semi-spherical shape, and peripheral edge parts of the filter elements 26A, 26B are integrally incorporated with each other by means of an integrally molded form 27 made of soft urethane resin or the like.

Since the peripheral edge parts are integrally incorporated with each other, the filter elements 26A, 26B are held in a semi-spherical shape.

The inner peripheral part of the integrally molded form 27 is fitted onto the outer peripheral part 29 of a funnel shape air-cleaner duct 28, and a form guide 30 is fitted onto the outer peripheral part of the integrally molded form 27. The duct part 31 of the air-cleaner duct 28 is connected to an air flow meter 20 as shown in FIG. 4.

The above-mentioned air-filter elements 26A, 26B have properties which are different from each other, that is, the filter element 26A is formed of a thin sponge having coarse pores while the filter element 26B is formed of a thick sponge having fine pores. A concave and convex shape three-dimensional cut 32 is made on the inner surface of the filter element 26B so as to prevent wrinkling.

Further, dust of a large particle size in air sucked into the air-cleaner filter 19 is removed by the filter element 26A, and then dust of a small particle size therein is removed by the filter element 26B. With this arrangement in which the filter elements 26A, 26B have different properties, that is, they have coarse pores and fine pores, respectively, the intake-air resistance of the air-cleaner filter 19 is decreased while dust can be satisfactorily removed.

According to the above-mentioned embodiment, the peripheral edge parts of the filter elements 26A, 26B in a multi-layer structure, are integrally incorporated with each other at their peripheral edge parts by the integrally molded form 27 so that the air-cleaner filter 19 is held in a substantially semi-spherical shape, and accordingly, it is possible to eliminate the necessity of covering the air-cleaner filters 2A, 2B with a holding member such as the nets 3, 4 or the like, as explained in the conventional air-cleaner filter 1 in order to maintain the filter in a substantially semi-spherical shape. Due to the absence of the holding member, the intake-air opening area of the air-cleaner filter 19 can be increased, and accordingly, the intake-air resistance can be decreased, whereby it is possible to enhance the output power of the engine 10.

Further, since the three-dimensional cut 32 is made on the inner peripheral surface of the filter element 26A of the air-cleaner filter 19, it is possible to prevent occurrence of wrinkling on the inner surface of the filter element 26B when the latter is formed into a substantially semi-spherical shape.

Figure 6:
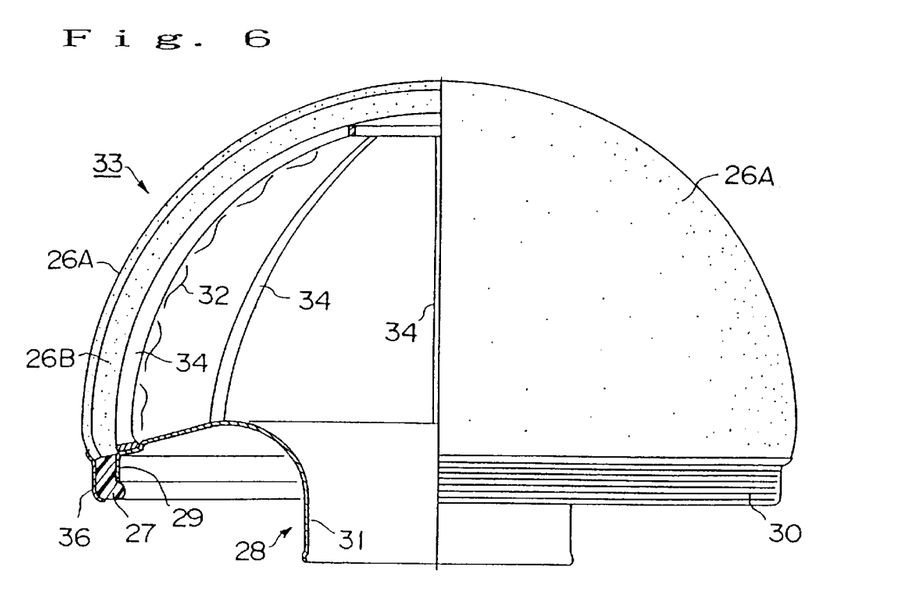
FIG. 6 is a side view illustrating a left-half part of another embodiment of the air-cleaner filter according to the present invention, which is shown being sectioned.
Figure 7:
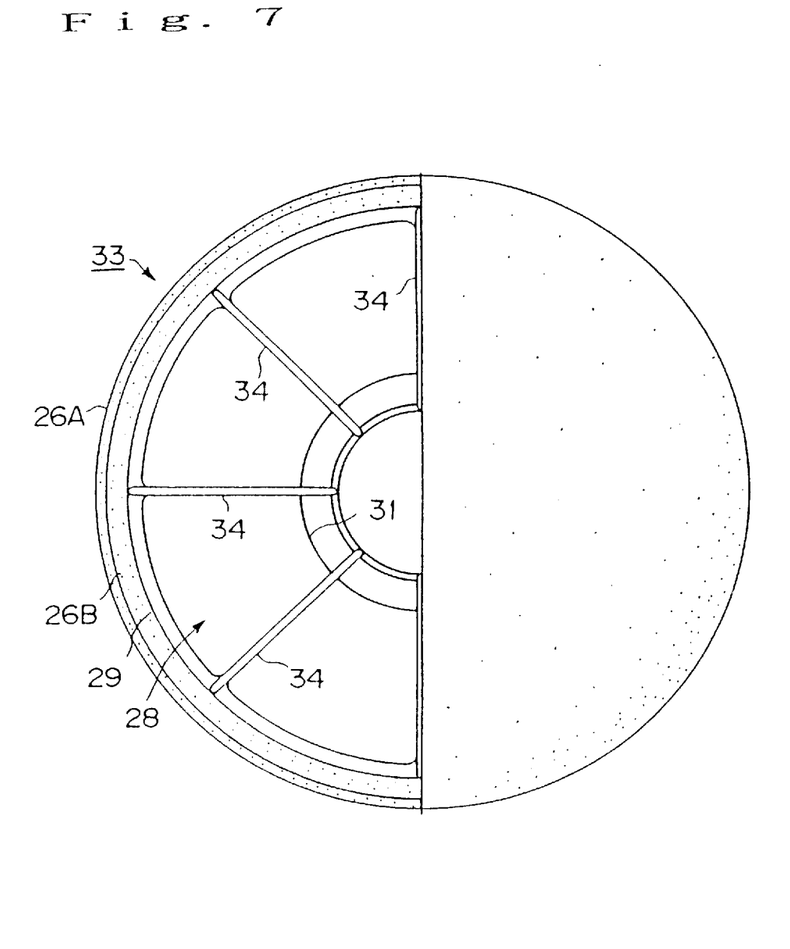
FIG. 7 is a plan view illustrating the left-half part of the air-cleaner filter shown in FIG. 6, which is shown being sectioned.

In the air-cleaner filter 33 shown in FIGS. 6 and 7, curved molded ribs 34 are planted, extending from the outer peripheral part 29 of the air-cleaner duct 28. These molded ribs 34 are laid at predetermined intervals in the circumferential direction of the outer peripheral part 29 of the air-cleaner duct 28. These molded ribs 34 are positioned along the inner peripheral shape of the filter element 26B. With these molded ribs 34, it is possible to prevent the air-cleaner filter elements 26A, 26B from being bent or deformed toward the duct part 31 of the air-cleaner duct 28 upon suction of intake-air by the air-cleaner filter 33.

It is noted that although explanation has been made such that the air-cleaner filter 19 or 33 shown in FIGS. 3 to 7, is composed of the filter elements 26A, 26B in a two-layer structure, it may be formed of filter elements in a three or more layer structure.

THIRD EMBODIMENT (FIGS. 8 to 11)

Referring to FIGS. 8 to 11, an air-cleaner apparatus 19 is composed of a funnel 26, an inner frame 27, an outer net 28 as an outer frame and a filter 29, for removing dust from air introduced into the engine 10 and enhancing the intake-air efficiency. The funnel 26 and the inner frame 27 are made of synthetic resin such as plastic while the outer net 28 is made of metal such as iron, and the filter 29 is made of porous resin.

Figure 8A:
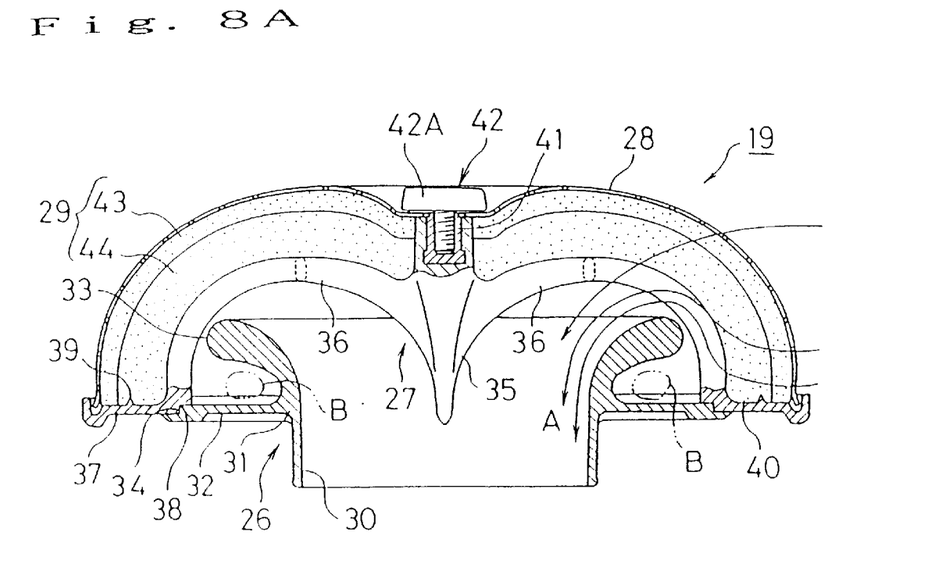
FIG. 8A is a side sectional view illustrating the air-cleaner apparatus.
Figure 8B:
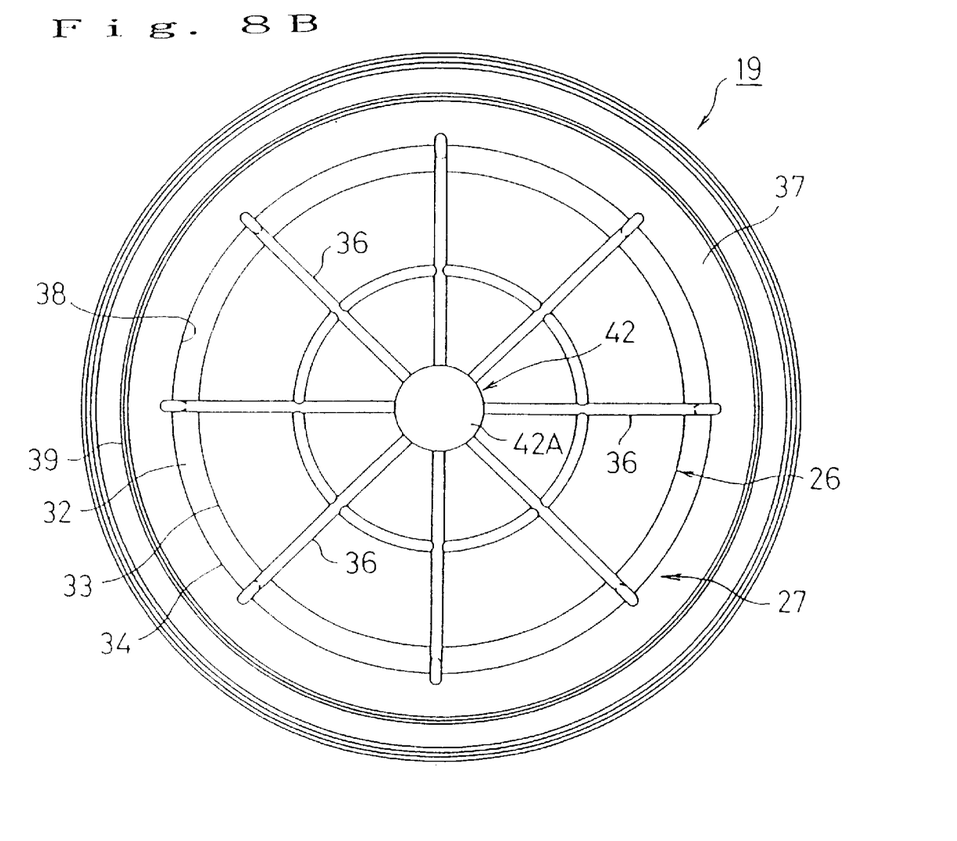
FIG. 8B is a plan view illustrating the air-cleaner apparatus from which a filter and an outer net are eliminated.
Figure 10A:
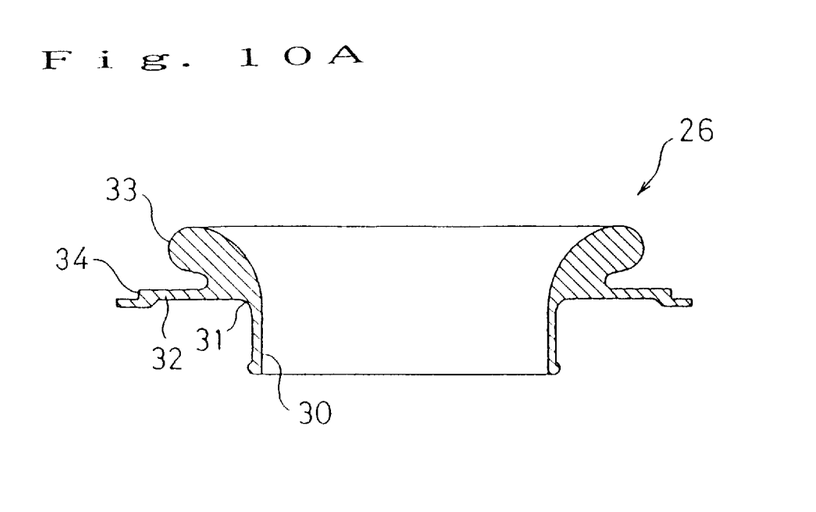
FIG. 10A is a side sectional view illustrating the funnel, and FIG. 10B a plan view illustrating the funnel.
Figure 10B:
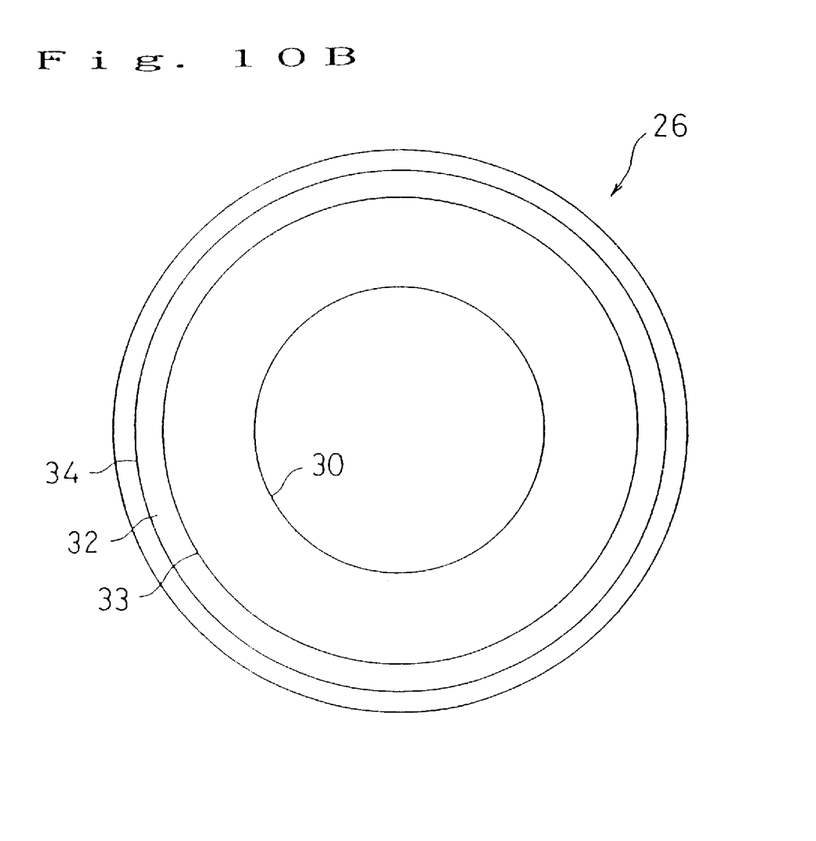

As shown in FIGS. 8 and 10, the funnel 26 has a duct part 30 which is connected thereto with a flared opening 31 whose diameter is gradually increased, and a flat part 32 is connected to the flared opening 31. Further, a lip part 33 is integrally planted on the inner peripheral surface of the flared opening 31. The duct part 30 can be connected to an air flow meter 20. Further, an engaging stepped part 34 is formed at the outer periphery of the flat part 32. An engaging end (which will be explained later) of the inner frame 27 can be engaged with the engaging stepped part 34.

The lip part 33 is formed opposing the stream A of air flowing into the air-cleaner apparatus 19, and this stream A of air induces a negative pressure area B between the lip part 33 and the flat part 32. Under the effect of this negative pressure area B, the flow rate of air flowing into the funnel 26 along a flat part 37 (which will be explained hereinbelow) of the inner frame 27 can be increased.

Figure 11A:
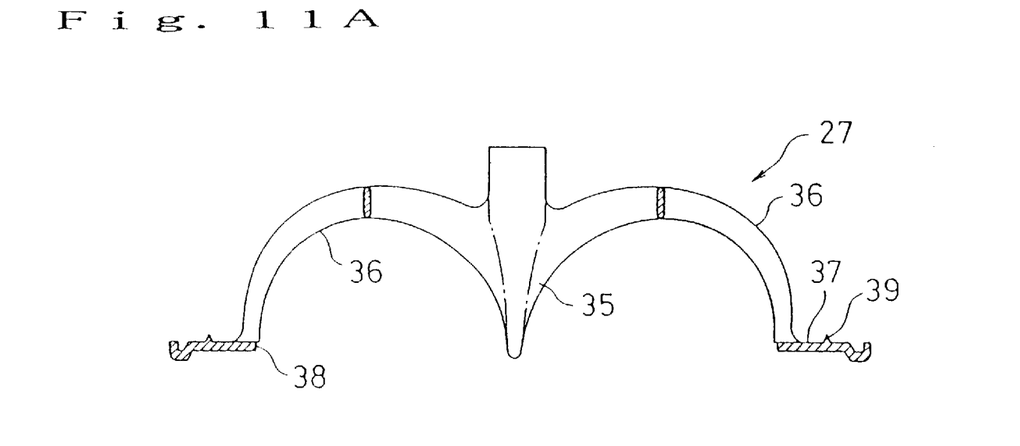
FIG. 11A is a side sectional view illustrating the inner frame.
Figure 11B:
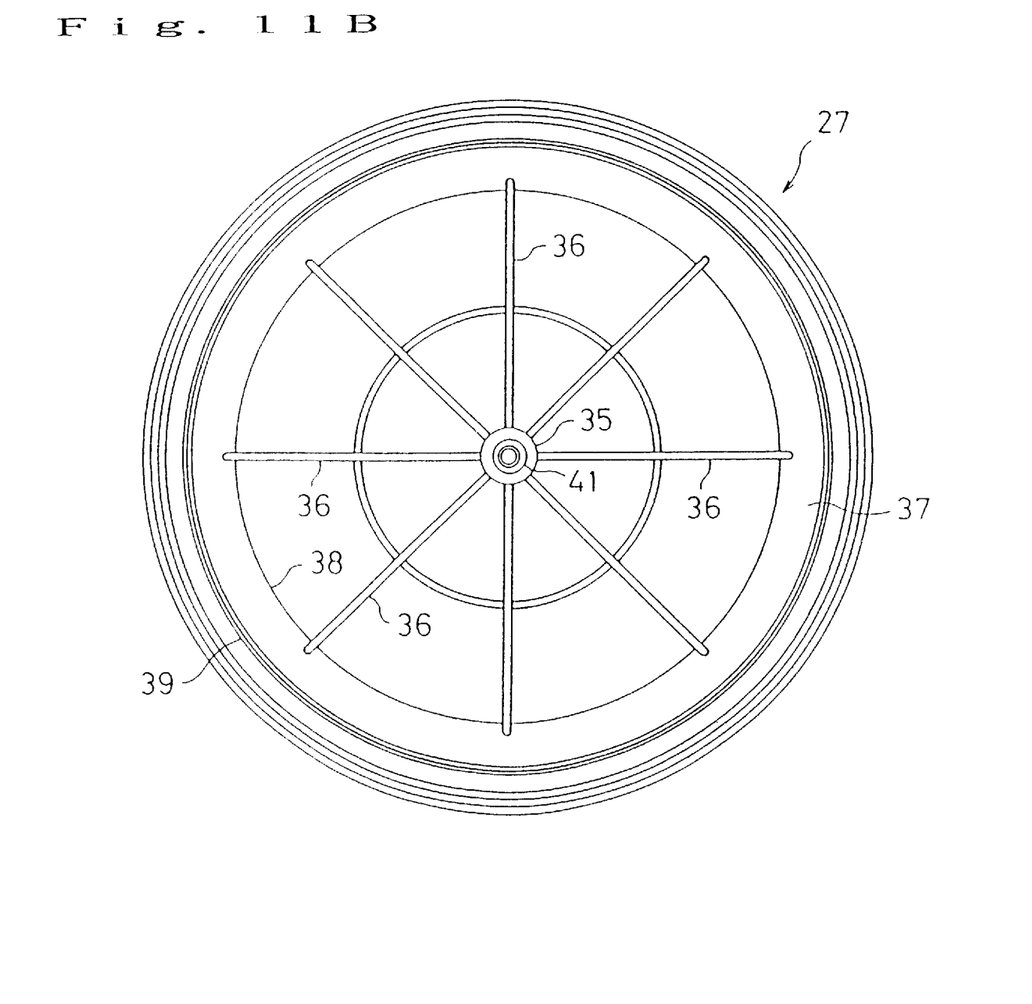
FIG. 11B is a plan view illustrating the inner frame.

As shown in FIGS. 8 and 11, the inner frame 27 is composed of a top part 35 extending from the flared opening part 31 of the funnel 26 to the center part of the duct part 30, frame bars 36 with which the lip part 33 of the funnel 26 is covered, and which radially extend from the top part 35, and a flat part 37 extend radially outward from the frame bars 36, orthogonal to the top part 35. The frame bars 36 have a stream line cross-sectional shape. The top part 35 and the frame bars 36 smooth the stream A of air flowing into the funnel 26.

The flat part 37 is engaged at its inner peripheral edge with an engaging edge 38 so as to be engaged with the engaging stepped part 34 of the funnel 26, and accordingly, the inner frame 27 is fitted to the funnel 26. In this assembled condition, the flat part 37 of the inner frame 27 is flush with the flat part 32 of the funnel 26 so as to define a flat surface, whereby it is possible to smooth the stream of air flowing along the flat parts 37, 32.

The flat part 37 of the inner frame 27 is formed at its outer surface with an engaging ridge 39. This engaging ridge 39 has a triangular cross-sectional shape and is adapted to stick into the end surface 40 of the filter 29 so as to restrain the filter 29 from being elastically deformed, and to prevent the end surface 40 of the filter 29 from floating up from the outer surface of the flat part 37.

A screw fitting part 41 is embedded in the top part 35, as shown in FIG. 8A and 11B, and a net retaining bolt 42 can be tightened into the screw fitting part 41. The net retaining bolt 42 has a large diameter head part 42A by which the outer net 28 is integrally incorporated with the top part 35 of the inner frame 27.

Figure 9A:
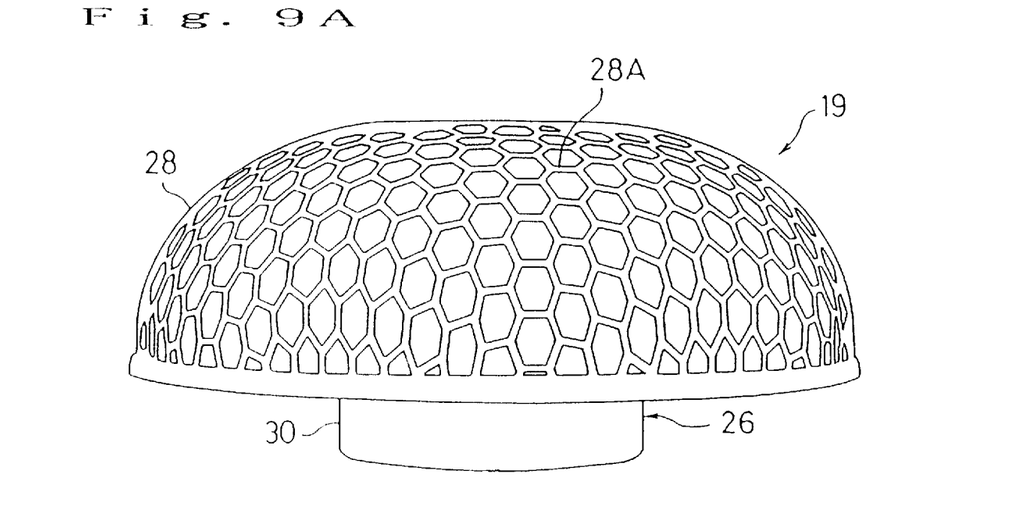
FIG. 9A is a side view illustrating the air-cleaner apparatus.
Figure 9B:
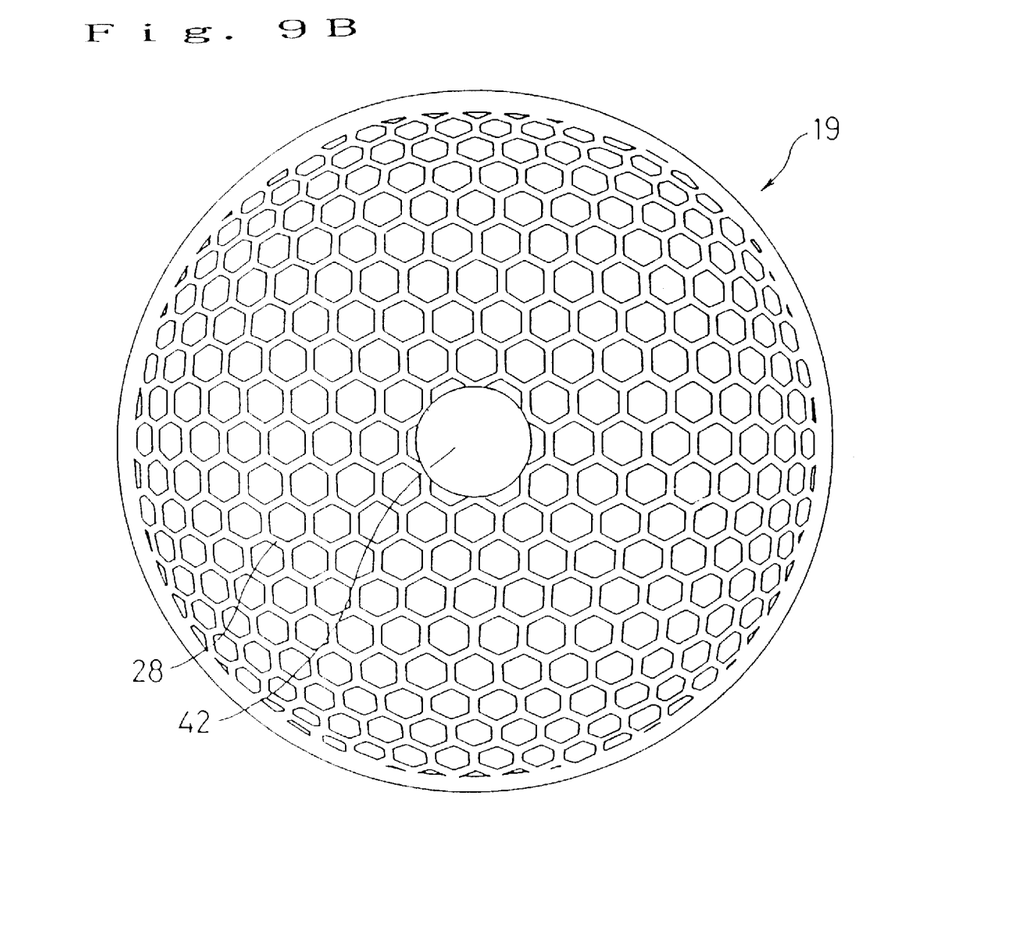
FIG. 9B is a plan view illustrating the air-cleaner apparatus.

The outer net 28 is formed of a honeycomb-like (hexagonal) net in a substantially semi-spherical shape. With this honeycomb-like net, deformation in the curved part 28A of the outer net 28 is equally divided into six portions at corner parts of the hexagon, and accordingly, the degree of the deformation at each corner becomes smaller than that of a rectangular net.

As shown in FIG. 8A, the filter 29 is composed of an outer filter 43 and an inner filter 44 which are joined together in a two layer structure, and which are formed of polyurethane resin. That is, the outer filter 43 is made of polyurethane resin having a large coarse pore size, but the inner filter 44 is made of polyurethane resin having an intermediate pore size. The outer filter 43 and the inner filter 44 are bonded together by heating and melting their bonding surfaces (which is the so-called lamination).

The outer filter 43 and the inner filter 44 are impregnated with a highly viscous adhesive (which is not shown) in order to enhance the dust collecting effect. For example, chlorinated paraffin is used as the highly viscous adhesive, preferably having a coefficient of viscosity which is higher than about 100 pa.s and lower than about 350 pa.s. The fibers of the outer filter 43 and the inner filter 44 are swollen and softened with the use of a solvent (such as methylene chloride or thinner), and thereafter, the softened fibers are impregnated with the highly viscous adhesive.

Next, explanation will be hereinbelow made of operation and effects.

Air flowing from the outer periphery of the air-cleaner apparatus 19 and passing through the meshes of the outer net 28, passes through the filter 29 and flows along the top part 35 of the inner frame 27 and the frame bars 36, and then flows into the duct part 30 along the lip part 33 and the flared opening 31 of the funnel 26. During passing through the filter 29, dust is removed from the air.

With the above-mentioned embodiment, since the lip part 33 is planted on the inner peripheral surface of the flared opening 31 of the funnel 26, the stream A of air induces the negative pressure area B between the lip part 33 of the funnel 26 and the flat part 32 so as to increase the flow rate of air flowing into the duct part 30 of the funnel 26 from the outer side of the flat part 37 of the inner frame 27, whereby it is possible to increase the volume of intake-air. Thus, it is possible to enhance the intake-air efficiency without the size of the air-cleaner apparatus 29 being increased by increasing the size of the funnel 26.

Further, since the inner frame 27 is composed of the top part 35 extending to the center part of the funnel 26, and since the top part 35 is composed of a plurality of the frame bars 36 radially extending from the top part 35 and having a stream line cross-sectional shape, the stream A of air flowing into the funnel 26 can be smoothed so as to reduce the flow passage resistance, whereby it is possible to enhance the intake-air efficiency.

Further, since the flat part 37 of the inner frame 27 is flush with the flat part 32 of the funnel 26 in the assembled condition between the funnel 26 and the inner frame 27, the stream of air flowing through the flat parts 32, 37 is not hindered, whereby it is possible to further enhance the intake-air efficiency.

Since the outer net 28 is formed of a honeycomb-like net in a substantially semi-spherical shape, deformation of the honeycomb net occurring in the curved part 28A is equally divided into 6 portions so that deformation at each corner of the honeycomb cell can be made smaller than that of a rectangular cell.

Accordingly, it is possible to prevent the stream A of intake-air from being hindered by the outer net 28, and in view of this point, it is possible to further enhance the intake-air efficiency.

Further, since the filter 29 is made of porous polyurethane resin, and since the filter 29 is impregnated with the highly viscous adhesive, the dust collecting effect can be enhanced by the highly viscous adhesive. Simultaneously, since the filter 29 can be impregnated with the highly viscous adhesive even though it has a large pore size, the flow passage resistance of the filter 29 becomes small, in comparison with such a case that the filter 29 is made of porous polyurethane resin having a small pore size.

In addition, since the engaging ridge 39 is formed on the flat part 37 of the inner frame 27 and is adapted to lock the end surface 40 of the filter 29, it is possible to prevent the end surface 40 from floating up, whereby it is possible to prevent lowering of the dust collecting effect of the filter 19.

INDUSTRIAL USABILITY

As mentioned above, the air filer apparatus for engine intake-air, according to the present invention, can prevent occurrence of a dust beating phenomenon, and can prevent damage during physical distribution, installation or usage thereof. Further, it is possible to enhance both dust collecting effect and intake-air efficiency of the air filter apparatus.

What is claimed is:

1. An air intake system for a vehicle engine, comprising:
an air cleaner apparatus and a cylindrically-shaped, open, air intake funnel having a periphery, a duct part defining one end of said funnel and a flared opening defining another end thereof, said air intake funnel communicating a stream of air therethrough and into said engine, said air stream flowing in a direction from said flared opening to said duct part, said air cleaner apparatus comprising an inner frame having a flat part, an outer frame engaging said flat part and a filter therebetween, both said frames concentrically disposed to cover said flared opening of said funnel,
said flared opening of said funnel formed by a lip part flaring away from a center of said funnel,
said funnel including an annular flat part disposed below said flared opening and radially extending about said periphery beyond said lip part,
wherein said inner frame flat part engages said flat part of said funnel so as to be coextensive therewith and to position said inner frame in a face-to-face relationship with said lip part, thereby forming a space between said lip part, said inner frame, and said flat part, wherein said air intake system is adapted to force said air stream across said flat part of said inner frame and said funnel before flowing to said flared opening, thereby causing an eddy current to be generated in said space, thereby generating a negative pressure area within said space, said negative pressure area creating a suction that improves a rate of air flow introduced into said engine.

2. The air-cleaner apparatus as set forth in claim 1, wherein the inner frame is composed of a top part extending toward a center of said flared opening of said funnel, and a plurality of frame bars radially extending from said top part.

3. The air-cleaner apparatus as set forth in claim 1, wherein said outer frame is formed of a honeycombed net.

4. The air-cleaner apparatus as set forth in claim 2, wherein said outer frame is formed of a honeycombed net.

5. The air-cleaner apparatus as set forth in claim 1, wherein said filter is made of a porous resin having a large pore size and impregnated with a highly viscous adhesive.

6. The air-cleaner apparatus as set forth in claim 2, wherein said filter is made of a porous resin having a large pore size and impregnated with a highly viscous adhesive.

7. The air-cleaner apparatus as set forth in claim 3, wherein said filter is made of a porous resin having a large pore size and impregnated with a highly viscous adhesive.

* * * * *